United States Patent
Saha

(10) Patent No.: US 12,456,089 B2
(45) Date of Patent: Oct. 28, 2025

(54) THRESHOLD-BASED AUTOMATED REARRANGEMENT OF OBJECT REPRESENTATIONS ON A GRAPHICAL USER INTERFACE

(71) Applicant: PSI Systems, Inc., El Segundo, CA (US)

(72) Inventor: Subhasis Saha, Pleasanton, CA (US)

(73) Assignee: PSI Systems, Inc., El Segundo, CA (US)

(*) Notice: Subject to any disclaimer, the term of this patent is extended or adjusted under 35 U.S.C. 154(b) by 590 days.

(21) Appl. No.: 16/903,260

(22) Filed: Jun. 16, 2020

(65) Prior Publication Data

US 2020/0311654 A1 Oct. 1, 2020

Related U.S. Application Data

(62) Division of application No. 13/842,654, filed on Mar. 15, 2013, now abandoned.

(60) Provisional application No. 61/739,449, filed on Dec. 19, 2012.

(51) Int. Cl.
G06Q 10/083 (2023.01)
G06F 30/12 (2020.01)

(52) U.S. Cl.
CPC .......... G06Q 10/083 (2013.01); G06F 30/12 (2020.01)

(58) Field of Classification Search
CPC .............................. G06Q 10/083; G06F 30/12
USPC ....................................................... 715/243
See application file for complete search history.

(56) References Cited

U.S. PATENT DOCUMENTS

| | | | | |
|---|---|---|---|---|
| 6,721,762 B1* | 4/2004 | Levine | ................... | G06Q 10/08 707/999.102 |
| 10,740,862 B1* | 8/2020 | Cui | ......................... | G06F 30/20 |
| 2004/0115802 A1* | 6/2004 | Dickson | ................... | B63J 99/00 435/326 |
| 2004/0167661 A1* | 8/2004 | Lesh | ....................... | B65B 57/10 700/213 |
| 2012/0283868 A1* | 11/2012 | Rutt | ...................... | G06Q 10/083 700/214 |

(Continued)

OTHER PUBLICATIONS

Balogh et al., On-line bin packing with restricted repacking, Journal of Combinatorial Optimization 27, 115-131, available at https://doi.org/10.1007/s10878-012-9489-4 (2014, initially published Apr. 11, 2012).*

(Continued)

*Primary Examiner* — William L Bashore

(57) ABSTRACT

In certain embodiments, threshold-based automated rearrangement of object representations on a graphical user interface (GUI) may be facilitated. In some embodiments, a user selection to organize objects based on one or more specific criteria may be received, where the specific criteria is a rearrangement threshold corresponding to a maximum number of rearrangement operations to be performed with respect to a set of objects. Placement of the objects may be determined based on the rearrangement threshold such that one or more objects are rearranged in a component to attempt to create an available region within which a given next object fits in the component without exceeding the rearrangement threshold. The object representations of the objects may be automatically moved to regions of a component representation of the component on the GUI based on the determined placement of the objects.

13 Claims, 11 Drawing Sheets

(56) References Cited

U.S. PATENT DOCUMENTS

| | | | | |
|---|---|---|---|---|
| 2013/0091445 A1* | 4/2013 | Treadway | ............ | G06F 3/04815 |
| | | | | 715/762 |
| 2013/0218799 A1* | 8/2013 | Lehmann | ............. | G06Q 10/063 |
| | | | | 705/337 |
| 2014/0172736 A1* | 6/2014 | Saha | ........................ | G06F 30/12 |
| | | | | 705/330 |
| 2016/0009508 A1* | 1/2016 | Gaikoski | .............. | G06Q 10/083 |
| | | | | 414/800 |
| 2020/0283245 A1* | 9/2020 | Gualtieri | .................. | G09B 9/00 |

OTHER PUBLICATIONS

Martello et al., The Three-Dimensional Bin Packing Problem, Operations Research, vol. 48, No. 2, pp. 256-267, available at https://www.jstor.org/stable/223143 (Mar. 2000).*

* cited by examiner

THRESHOLD-BASED AUTOMATED REARRANGEMENT OF OBJECT REPRESENTATIONS ON A GRAPHICAL USER INTERFACE

CROSS-REFERENCE TO RELATED APPLICATIONS

This application is a divisional of U.S. patent application Ser. No. 13/842,654, filed Mar. 15, 2013, which claims the benefit of U.S. Provisional Application No. 61/739,449, filed Dec. 19, 2012, each of which are hereby incorporated by reference in its entirety.

FIELD

The disclosure relates to facilitate movement or placement of objects, including, for example, threshold-based movement or placement of object representations to regions of a graphical user interface (GUI).

BACKGROUND

Object placement is often an important criteria in a number of contexts, and a number of software tools and interfaces have been created to enable individuals to simulate placement of real-world objects so that predicted results of such object placements are obtained prior to actually performing physical movement or placement of the real-world objects, thereby mitigating the amount of physical labor. Such software tools and interfaces, however, do not address one or more criteria as indicated herein.

SUMMARY

In certain embodiments, threshold-based automated rearrangement of object representations on a graphical user interface (GUI) may be facilitated. In some embodiments, a user selection to organize objects based on one or more specific criteria may be received, where the specific criteria includes a rearrangement threshold corresponding to a maximum number of rearrangement operations to be performed with respect to a set of objects. Placement of the objects may be determined based on the rearrangement threshold such that one or more objects are rearranged in a component to attempt to create an available region within which a given next object fits in the component without exceeding the rearrangement threshold. The object representations of the objects may be automatically moved to regions of a component representation of the component on the GUI based on the determined placement of the objects.

Various other objects, features, and advantages of the embodiments will be apparent through the detailed description and the drawings attached hereto. It also is to be understood that both the foregoing general description and the following detailed description are exemplary and not restrictive of the scope of the embodiments.

DETAILED DESCRIPTION

Figure 1:
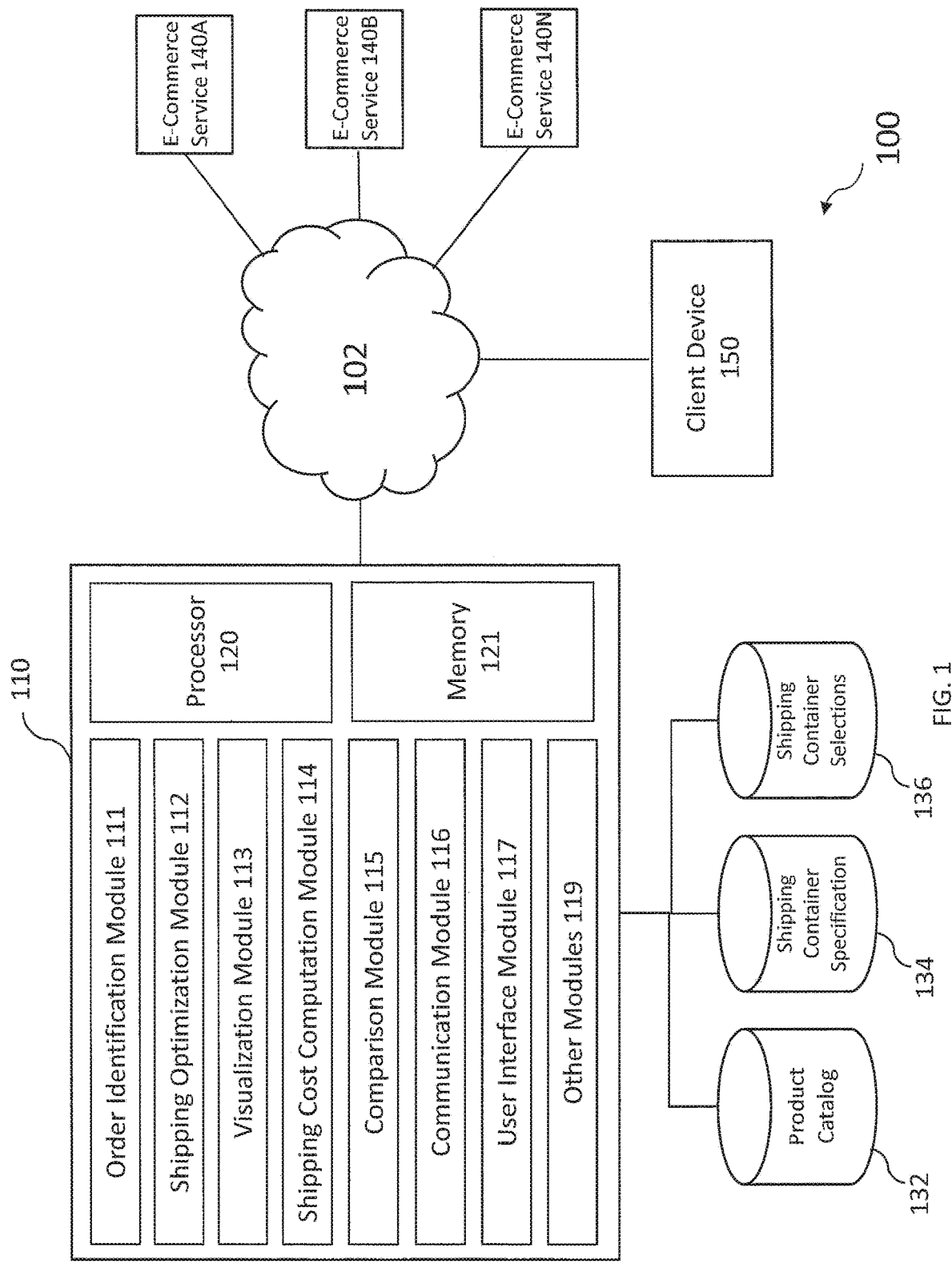
FIG. 1 illustrates a system of optimizing use of standardized containers, according to an aspect of the invention.

FIG. 1 illustrates a system 100 of optimizing use of standardized containers, according to an aspect of the invention.

System 100 may include a computer 110 and/or other components. In some implementation, computer 110 may include one or more processors 120 configured to perform some or all of a functionality of a plurality of computer program modules, which may be stored in a memory 121. For example, one or more processors 120 may be configured to execute an order identification module 111, a shipping optimization module 112, a visualization module 113, a shipping cost computation module 114, a comparison module 115, a communication module 116, a user interface module 117, and/or other modules 119.

Order identification module 111 may be configured to identify an order comprising one or more items and/or product items (e.g., Stock-Keeping-Unit (SKU) numbers, etc.) to be shipped. The order may be specified or otherwise provided by a user via a client device 150, the computer 100, one or more e-commerce services (as illustrated as 140A, 140B, . . . , 140N), and/or other systems and/or services. Order identification module 111 may be configured to obtain order information comprising identifications of the one or more items to be shipped, quantity information, item specifications (e.g., dimensional information, weight, fragility, etc.).

In some embodiments, order identification module 111 may be configured to interact, through a network 102, with e-commerce services 140 (as illustrated as 140A, 140B, . . . , 140N) and/or other computer systems. E-commerce services 140 may be operated, maintained, and/or managed by third-party vendors in some instances. For example, a customer may select one or more product items via an e-commerce service 140A and save the items in a shopping cart. Once the customer is ready to check out the items, e-commerce service 140A may direct the customer to a shipping page to determine the cost for shipping the items in the shopping cart. Order identification module 111 may be configured to receive the order information from e-commerce service 140A where the order information may include SKU information, order quantities, and/or item specifications for each product item in the shopping cart (and/or of the order). The order information may be modified or otherwise updated by adding, removing, and/or changing quantities for product items.

In some embodiment, system 110 may operate and/or function as a stand-alone system independent of e-commerce systems (e.g., e-commerce service 140A, 140B, or 140N). For example, a user may access system 110 via, for example, one or more interfaces (e.g., web pages) communicated from computer 110 to client device 150 (e.g., a home computer, a mobile phone, a kiosk at a post office, etc.), an application such as a mobile application executing on client device 150 that generates the interface based on information communicated from computer 110, an agent running on computer 110, and/or via other interfaces. For example, computer 110 may communicate one or more interfaces that may provide a network-based and/or mobile-application-based shipping cost calculator which may calculate a cost for shipping one or more items using standardized containers. In this example, the user may specify one or more items to be shipped (e.g., SKU number), dimensions, quantity, weight, fragility, and/or other information related to the one or more items via client device 150. In some embodiments, item specifications and/or product information such as dimensions, quantity, weight, fragility, and/or other information related to the one or more items may be obtained from a product catalog which may be stored in a product catalog database 132 coupled to computer 110 and/or other external database.

In some embodiments, e-commerce service 140A may maintain a product catalog that may store information related to the product items being sold by the vendor related to e-commerce service 140A. Order identification module 111 may search the product catalog to identify and/or retrieve item specifications for the product items included in the order. For example, order identification module 111 may use the SKU numbers (or other product identifier) in the order information to identify matching SKU numbers in the product catalog. Based on the identified SKU number (or other product identifier), item specifications (e.g., dimensional information, weight, fragility, etc.) associated with the SKU numbers (or other product identifiers) may be retrieved from the product catalog. A customer may also select and purchase one or more product items using different e-commerce services such as e-commerce service 140B, . . . , 140N. The product catalog may be stored in a database that may be linked to e-commerce service 140A.

Product catalog database 132 may be updated in various ways. In some embodiments, product catalog database 132 may be periodically updated. For example, product catalog information may be periodically (e.g., once a day, once an hour, etc.) downloaded in a batch file (e.g., csv, xsl, etc.) using electronic file transfer protocols (e.g., FTP, SFTP, etc.) to update product catalog database 132. In other embodiments, e-commerce service 140A may transmit product catalog information whenever the product catalog has been modified to update product catalog database 132. In some embodiments, product catalog database 132 may be pre-loaded with product catalog information including standard SKU/UPC numbers provided by third-party sources (e.g., a manufacturer). In some embodiments, when the production information related to a particular product item and/or order is not available in product catalog database 132, computer 110 may make a real-time call into e-commerce systems (e.g., e-commerce service 140A, 140B, or 140N), third-party sources, and/or other external systems using a pre-established set of Application Programming Interface (API) calls (e.g., SOAP/XML) to obtain the product information.

Shipping optimization module 112 may be configured to determine an optimal number and size of standardized containers for shipping the one or more items in the order. The standardized containers may include fixed-rate shipping boxes. There may be several possible container size options. The shipping rate may vary depending on the size of the fixed-rate box. For example, a larger box may be associated with a higher shipping rate than a smaller box. As an example, the United Stated Postal Service (USPS) provides flat-rate shipping boxes in varying sizes (e.g., small, medium, and large). For example, a USPS Priority Mail Small Flat Rate Box may have inside dimensions of $8\frac{5}{8}$ inches*$5\frac{3}{8}$ inches*$1\frac{5}{8}$ inches and outside dimensions of $8\frac{11}{16}$ inches*$5\frac{7}{16}$ inches*$1\frac{3}{4}$ inches with a retail shipping rate of $5.35 (up to 70 lbs. for shipping in U.S.). A USPS Priority Mail Medium Flat Rate Box may have inside dimensions of 11 inches*$8\frac{1}{2}$ inches*$5\frac{1}{2}$ inches and outside dimensions of $11\frac{1}{4}$ inches*$8\frac{3}{4}$ inches*6 inches with a retail shipping rate of $11.35 (up to 70 lbs. for shipping in U.S.). A USPS Priority Mail Large Flat Rate Box may have inside dimensions of 12 inches*12 inches*$5\frac{1}{2}$ inches and outside dimensions of $12\frac{1}{4}$ inches*$12\frac{1}{4}$ inches*6 inches with a retail shipping rate of $15.45 (up to 70 lbs. for shipping in U.S.). The shipping rate for a standardized container of a particular size may be fixed irrespective of the number of items that are actually put into such a container. With such standardized shipping containers, customers may simply place an item in a selected shipping container and ship the item at a fixed price, regardless of weight of the item or destination. Various other types of standardized containers provided by different shipping carriers may also be used.

In some embodiments, shipping optimization module 112 may be configured to access and/or obtain a specification of standardized containers which may be stored in a shipping container specification database 134 and/or any other databases (e.g., USPS database, other postal carrier or shipping services database, etc.). The specification of standardized containers may comprise dimensional information (e.g., width, length, height, volume, shape, etc.), a weight limit, a shipping rate, a delivery time for shipping, and/or other information related to standardized containers.

Shipping optimization module 112 may be configured to determine an optimal number of standardized containers, such as by determining a fewest number of standardized containers for shipping the one or more items in the order and/or by determining the combination of standardized containers having the lowest combined shipping cost. In some instances reducing the number of shipping containers, the overall shipping cost may also be minimized and/or reduced. In some embodiments, shipping optimization module 112 may sort the one or more items by size (e.g., from largest to smallest) based on the dimensional information (e.g., width, length, height, volume, shape, etc.) related to the one or more items. For example, the size of an item may be determined by finding the longest dimension of that item. In this example, a first item with dimensions of 5 inches width*10 inches length*2 inches height may be considered larger in size than a second item with dimensions of 9 inches width*9 inches length*5 inches height because the longest dimension of the first item is 10 inches whereas the longest dimension for the second item is only 9 inches. In another example, the size of an item may be determined by calculating a volume (e.g., width*length*height) of the item. In that case, the first item may be considered smaller in size than the second item because the volume of the first item is 100 in$^3$ (e.g., 5 inches*10 inches*2 inches) whereas the volume of the second item is 405 in$^3$ (e.g., 9 inches*9 inches*5 inches).

In some embodiments, shipping optimization module 112 may determine the size of a first standardized container based on the size of the largest item (determined based on the sorting). In some embodiments, shipping optimization module 112 may simply select the largest standardized container available for shipping as the first standardized container. For example, the largest flat-rate box provided by USPS may be selected as the first container. Once the size of the first standardized container has been determined, shipping optimization module 112 may be configured to assign the largest item to the first container.

Shipping optimization module 112 may identify a second largest item that has been determined based on the sorting and determine whether the second largest item may be placed and/or fitted in the first standardized container. If the second largest item fits into the first standardized container, the item may be assigned to the first container as well. On the other hand, if it is determined that the second largest item does not fit into the first container, shipping optimization module 112 may assign the second largest item to a second standardized container. Once the second largest item has been assigned a shipping container, shipping optimization module 112 may identify a third largest item and determine whether the third largest item may be placed and/or fitted in any of the existing containers. For example, if the third largest item fits into the first container, it may be assigned to that container. If not, shipping optimization module 112 may check whether it may fit into the second container, if there is one. If it is determined that the third largest item does not fit into any of the existing containers, shipping optimization module 112 may assign the third largest item to a third standardized container. The size of second and/or third containers may be determined as discussed herein with respect to determining the size of the first container. In this manner, shipping optimization module 112 may iteratively identify a next largest item and assign the item to a container until all of the items have been assigned to a container.

In some embodiments, shipping optimization module 112 may be configured to determine whether a weight limit related to a given container is violated if a next largest item is added to the container. For example, the sum of a combined weight of the existing items currently placed in the container and the weight of the next largest item may not exceed the weight limit of that container. If it is determined the sum exceeds the weight limit, shipping optimization module 112 may check whether the next largest item fits into any of the other existing containers. If it is determined that the next largest item does not fit into any of the other existing containers (or there is no other containers left to be checked), shipping optimization module 112 may assign the next largest item to a new container. In some embodiments, to determine whether a particular item can fit in a given container, shipping optimization module 112 may use a cornering technique. The cornering technique may assume that standardized containers are rectangular in shape, and so are any items that may be placed in those containers and that the items are laid "flat" in the container in such a way that all edges of the rectangular item are parallel to the longitudinal axis (x), vertical axis (z), or transverse axis (y) of the rectangular container. After an item gets placed in a particular corner (and/or before a first item gets placed in an empty container), shipping optimization module 112 may identify all possible locations ("open corners") in which a next item may be placed.

Shipping optimization module 112 may then select one of the identified possible open corners to place the next item. In selecting an open corner to place the next item, shipping optimization module 112 may identify all possible placement configurations of the item and/or determine an optimal placement configuration for the item. The placement configuration of an item may be changed by changing a rotational orientation of the item. Assuming that an item is rectangular in shape, there may be a total of 6 possible placement configurations for each item by considering all possible rotations of the item. Shipping optimization module 112 may compare dimensions of the container with dimensions of the item to narrow down the number of possible choices for the placement configuration. For example, if the item in a particular placement configuration does not fit in the container using the selected corner (e.g., dimensions of the item in the particular placement configuration is larger than a dimensional space that is available around the selected corner), that particular placement configuration may not be the right choice and may be excluded from the possible choices. If it is determined that none of the possible placement configurations allows a proper placement of the item in the selected corner, shipping optimization module 112 may try a different open corner and check whether any of the possible placement configurations of the item allows the item to be properly placed in that corner. This process may continue until an open corner with a placement configuration in which the item may be properly placed can be identified. If none of the identified possible open corners (or different placement configurations for each corner) allows the item to be properly placed in the given container, shipping optimization module 112 may determine and/or conclude that the item does not fit in the given container.

In some embodiments, shipping optimization module 112 may be configured to keep track of a total number of possible open corners in which a next item may be placed and the locations of those open corners. Each time an item is assigned to a container and occupies a particular corner, a maximum of 3 new open corners may be created by the item's placement in that particular corner. A next item may be assigned to the same container if it can be placed in one of the possible open corners. Thus, whenever an item is placed in a particular corner among the existing open corners, shipping optimization module 112 may update the total number of possible open corners in which a next item may be placed. In this case, the total number of possible open corners may equal to: (the number of previous open corners−the number of open corners that have just been occupied by the item)+the number of new open corners created by the placement of the item.

For example, in an empty rectangular container, there are initially a total of 8 possible open corners (e.g., top 4 corners and bottom 4 corners) in which an item may be placed. However, once a first item is placed in one corner of the container, only 3 bottom corners (out of 8) may remain as possible open corners for a next item depending on the orientation of the container. Therefore, the total number after the placement of the first item in this empty container may equal to 6 open corners (e.g., 3 remaining bottom corners+3 new open corners created by the placement of the first item). If a second item gets placed in one of the 6 possible open corners, the total number of possible open corners may be updated to 8 (e.g., (6 previous open corners−1 corner occupied by the second item)+3 new open corners created by the placement of the second item).

In some embodiments, shipping optimization module 112 may be configured to perform a backtracking operation if it is determined that a next item does not fit in the current container using the current configuration of how other existing items are positioned in that container. In other words, none of the identified possible open corners (or different placement configurations for each corner) allows the next item to be placed in the current container. The backtracking operation may be performed by re-arranging the existing items in the container using different combinations of open corners and/or placement configurations. For example, if there had been 3 items in a given container and a fourth item failed to fit in the container using the current configuration of how the 3 items are placed in the container, shipping optimization module 112 may backtrack to a point at which the third item was getting placed in the container. For example, instead of the placement configuration that was previously selected for the placement of the third item, a different placement configuration may be selected. In another example, instead of the open corner that was previously selected for the third item, a different open corner may be selected. Once the third item is placed in a different open corner and/or a different placement configuration, shipping optimization module 112 may determine whether the fourth item can now fit in the given container. If it is determined that the fourth item still does not fit in the container, shipping optimization module 112 may backtrack to a point at which the second item was getting placed in the container.

In some embodiments, shipping optimization module 112 may cease the backtracking operation when it has backtracked all the way to a point at which the first item was getting placed in the container and determined that the fourth item still does not fit in the container using any of possible open corner and placement configuration combinations. Shipping module 112 may cease the backtracking operation at that point and/or place the fourth item in a new container. In some embodiments, shipping optimization module 112 may cease the backtracking operation after a predefined number of iterations of backtracking. For example, a user may set the threshold number to be 2 iterations. Using the example above, if it is determined that the fourth item still does not fit in the container using any of possible open corner and placement configuration combinations after shipping optimization module 112 backtracks for the second time (to a point at which the second item was getting placed in the container), shipping optimization module 112 may cease the backtracking operation at that point and/or place the fourth item in a new container. Shipping optimization module 112 may be configured to determine an optimal size of standardized containers by re-evaluating the size of each of the standardized containers within the fewest number of standardized containers. In other words, the optimal number (e.g., the fewest number) of containers determined by shipping optimization module 112 does not change during this re-evaluation of the size related to the containers.

In some embodiments, shipping optimization module 112 may be configured to determine whether the combined weight of the items assigned to each of the containers within the fewest number of containers exceeds a weight limit related to a smaller sized container. If it determined that the combined weight exceeds the weight limit, the smaller container may not be used to ship the items.

In some embodiments, shipping optimization module 112 may determine whether the items assigned to a container may fit into a smaller container based on dimensional information related to the items and dimensional information related to the smaller container. In some embodiments, shipping optimization 112 may check if a smaller box may be used to contain the items without re-arranging the items (e.g., changing the positions, locations, corners, and/or rotations of the items). In other embodiments, shipping optimization 112 may re-arrange the items to fit the items into a smaller container. In re-arranging the items to fit them into a smaller container, the cornering technique and/or the backtracking technique as discussed herein may be similarly applied.

In some embodiments, shipping optimization module 112 may be configured to store previously-determined container selections for shipping an item and/or a particular combination of items (e.g., the number of containers used and/or the size of each of those containers used to ship the item and/or the particular combination of items), placement configurations (e.g., the way that the item and/or the particular combination of items were placed in each of those containers selected), and/or other information in a shipping container selections database 136, for example. In this way, the previously-determined information may be subsequently retrieved from shipping container selections database 136 to determine an optimal number/size of standardized shipping containers to use for shipping similar (or identical) item and/or similar (or identical) combination of items.

Visualization module 113 may be configured to communicate a visual representation of how the items are positioned and/or placed in the standardized containers. The visual representation may be communicated via a user interface. In some embodiments, the visual representation comprises a three-dimensional graphic.

Figure 6:
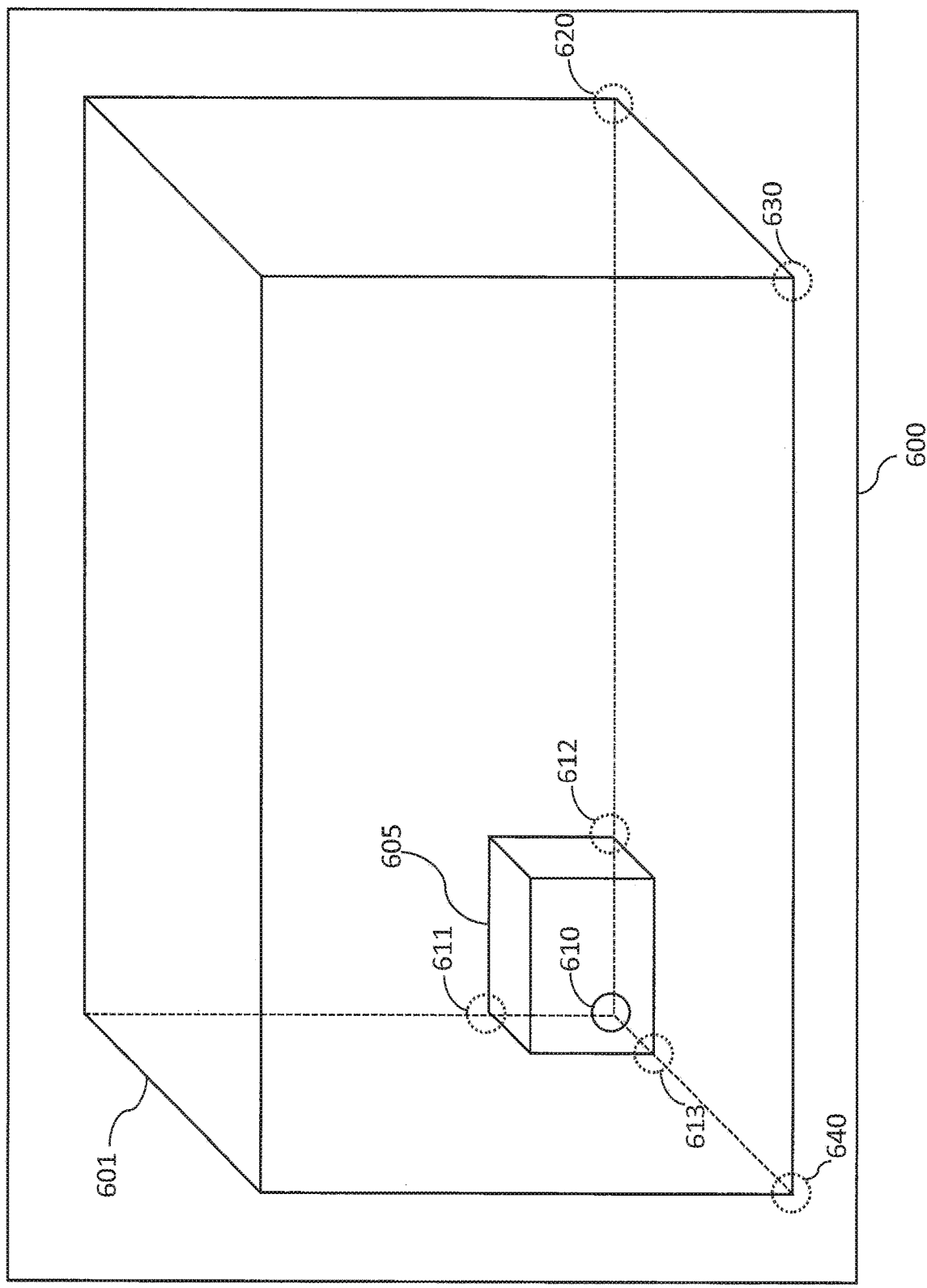
FIG. 6 illustrates a visual representation of how a cornering technique may be implemented, according to an aspect of the invention.
Figure 7:
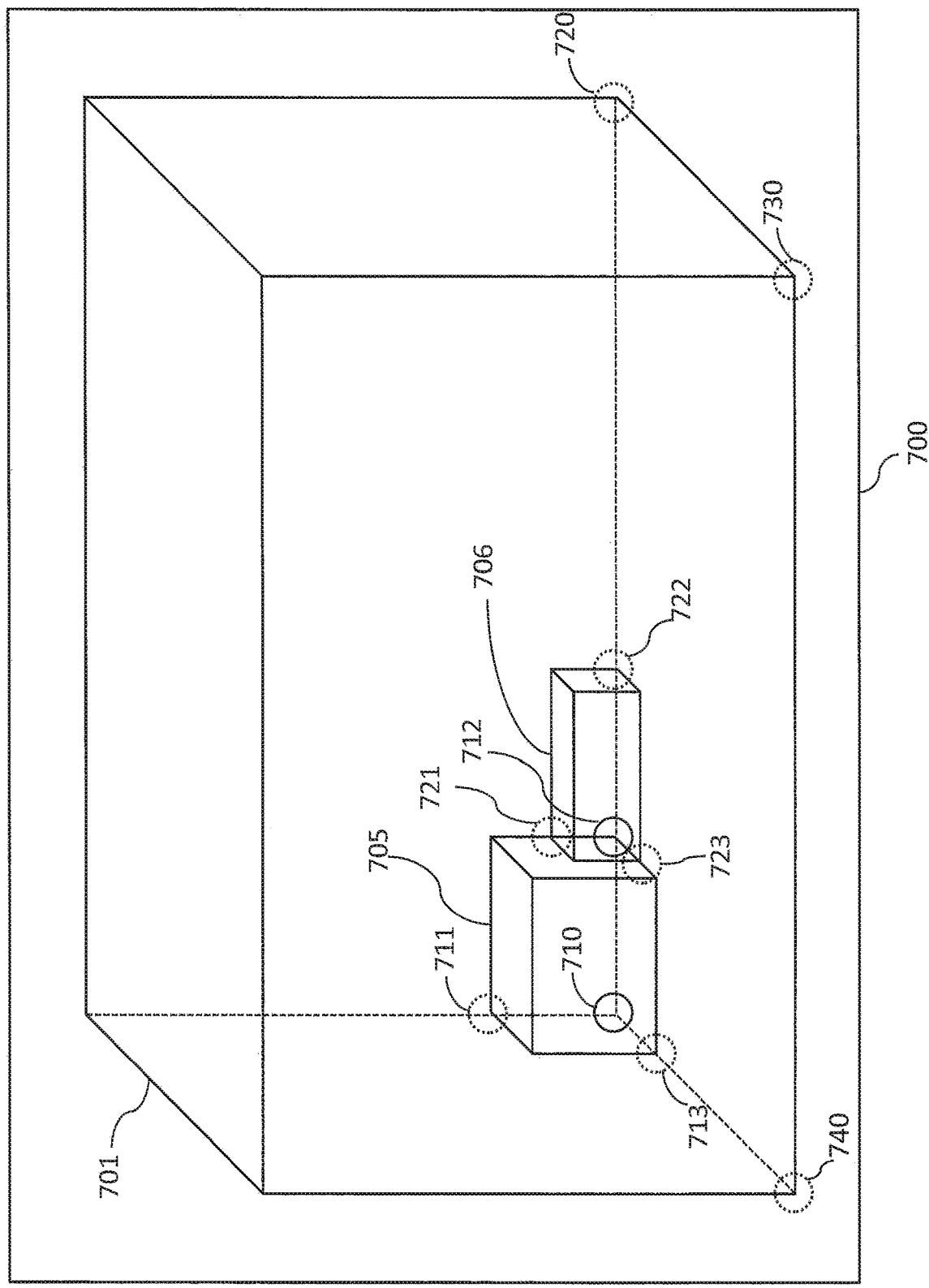
FIG. 7 illustrates a visual representation of how a cornering technique may be implemented, according to an aspect of the invention.
Figure 8:
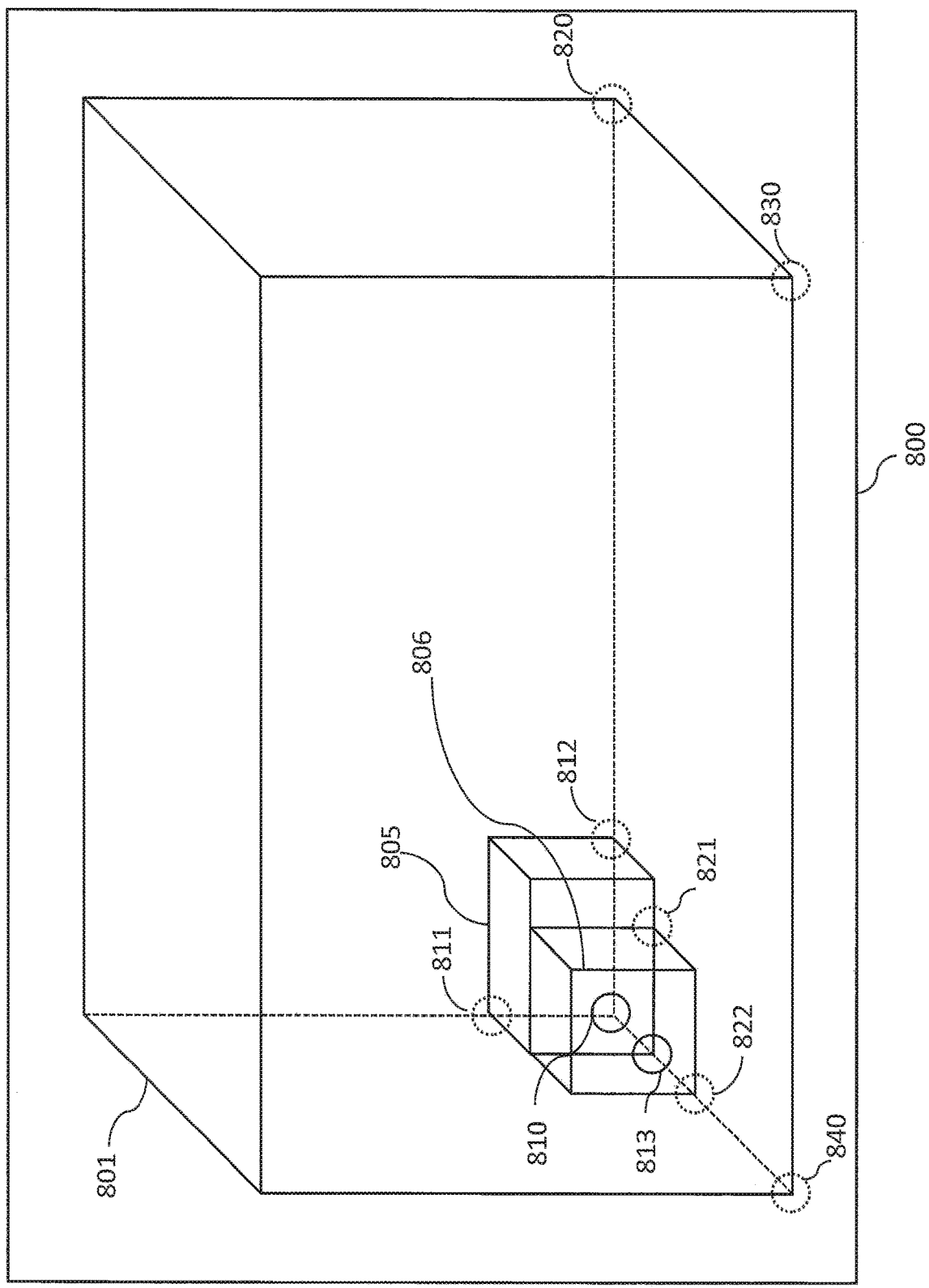
FIG. 8 illustrates a visual representation of how a cornering technique may be implemented, according to an aspect of the invention.

Exemplary visual representations generated by visualization module 113 are illustrated in FIGS. 6-8.

In some embodiments, visualization module 113 may be configured to receive an input from a user where the user may re-arrange the items (e.g., changing the positions, locations, corners, and/or rotations of the items) in the containers using the visual representation.

Shipping cost computation module 114 may be configured to calculate or otherwise determine a shipping cost for the order based on the number and size of the standardized containers as determined by shipping optimization module 112.

Comparison module 115 may be configured to compare the shipping cost determined by shipping cost computation module 114 with the shipping costs that may be calculated based on different shipping options (e.g., USPS regular Priority/Express mail, United Parcel Services (UPS) Express, Next Day Air, Ground mail, etc.). Comparison module 115 may determine a lowest shipping cost based on the comparison.

Communication module 116 may be configured to communicate the lowest shipping cost to one or more e-commerce services 140 and/or other computer systems. In some embodiments, user interface module 117 may be configured to generate a user interface that displays the lowest shipping cost to an end-user or other customer. In other embodiments, user interface module 117 may be configured to display a shipping cost that may be different from the lowest shipping cost communicated via communication module 116. For example, the lowest shipping cost can be captured by an e-commerce service (e.g., e-commerce service 140A, 140B, or 140N), but a different (e.g., a higher or a lower) shipping cost may be displayed by user interface module 117 and/or charged to the end-user or other customer.

Those having ordinary skill in the art will recognize that computer 110 and client device 150 may each comprise one or more processors, one or more interfaces (to various peripheral devices or components), memory, one or more storage devices, and/or other components coupled via a bus. The memory may comprise random access memory (RAM), read only memory (ROM), or other memory. The memory may store computer-executable instructions to be executed by the processor as well as data that may be manipulated by the processor. The storage devices may comprise floppy disks, hard disks, optical disks, tapes, or other storage devices for storing computer-executable instructions and/or data.

One or more applications, including various modules, may be loaded into memory and run on an operating system of computer 110 and/or client device 150. In one implementation, computer 110 and client device 150 may each comprise a server device, a desktop computer, a laptop, a cell phone, a smart phone, a Personal Digital Assistant, a pocket PC, or other device.

Network 102 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

Figure 2:
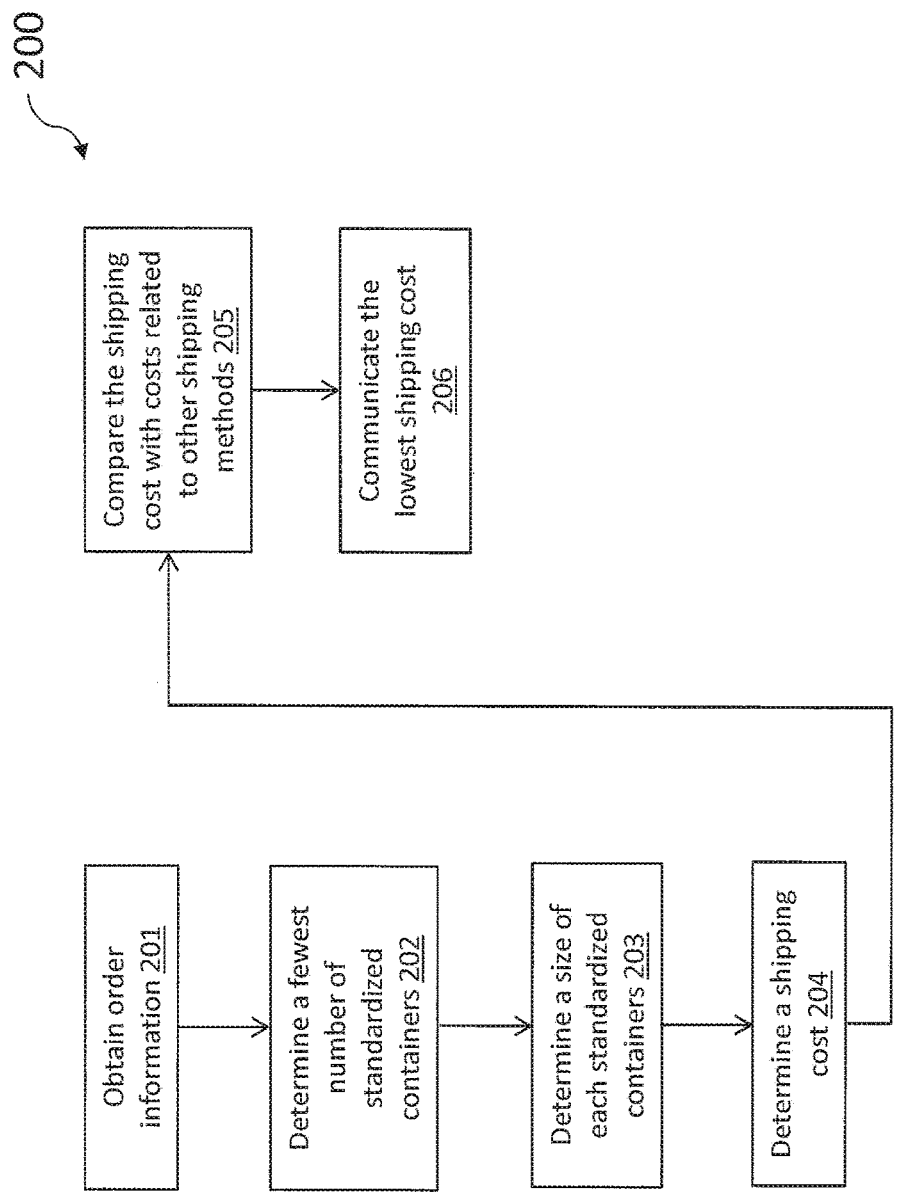
FIG. 2 illustrates a process for determining a shipping cost based on optimizing use of standardized containers, according to an aspect of the invention.

FIG. 2 illustrates a process 200 for determining an optimal number and size of standardized containers, according to an aspect of the invention. The various processing operations and/or data flows depicted in FIG. 2 (and in the other drawing figures) are described in greater detail herein. The described operations may be accomplished using some or all of the system components described in detail above and, in some embodiments, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Referring to FIG. 2, in an operation 201, process 200 may include obtaining order information comprising identifications of one or more product items associated with a particular order (e.g., Stock-Keeping-Unit (SKU) numbers, etc.), quantity information, product item specifications (e.g., dimensional information, weight, fragility, etc.).

In an operation 202, process 200 may include determining an optimal number of standardized containers by determining a fewest number of standardized containers for shipping the one or more items in the order. In some embodiments, process 200 may sort the one or more items by size (e.g., from largest to smallest) based on the dimensional information (e.g., width, length, height, volume, shape, etc.) related to the one or more items. Process 200 may select a first standardized container in which the largest item may fit. Process 200 may iteratively identify a next largest item and assign the item to a container until all of the items have been assigned to a container. To determine whether a particular item can fit in a given container, process 200 may use a cornering technique.

In an operation 203, process 200 may include determining an optimal size of standardized containers by re-evaluating the size of each of the standardized containers within the fewest number of standardized containers. In other words, the optimal number (e.g., the fewest number) of containers determined by the shipping optimization module does not change during this re-evaluation of the size related to the containers.

In an operation 204, process 200 may include calculating or otherwise determining a shipping cost for the order based on the number and size of the standardized containers as determined in operation 202 and/or operation 203.

In an operation 205, process 200 may include comparing the shipping cost determined in operation 204 with the shipping costs that may be calculated based on different shipping options. Process 200 may determine a lowest shipping cost based on the comparison.

In an operation 206, process 200 may include communicating the lowest shipping cost to the user, via a user interface, for example.

Figure 3:
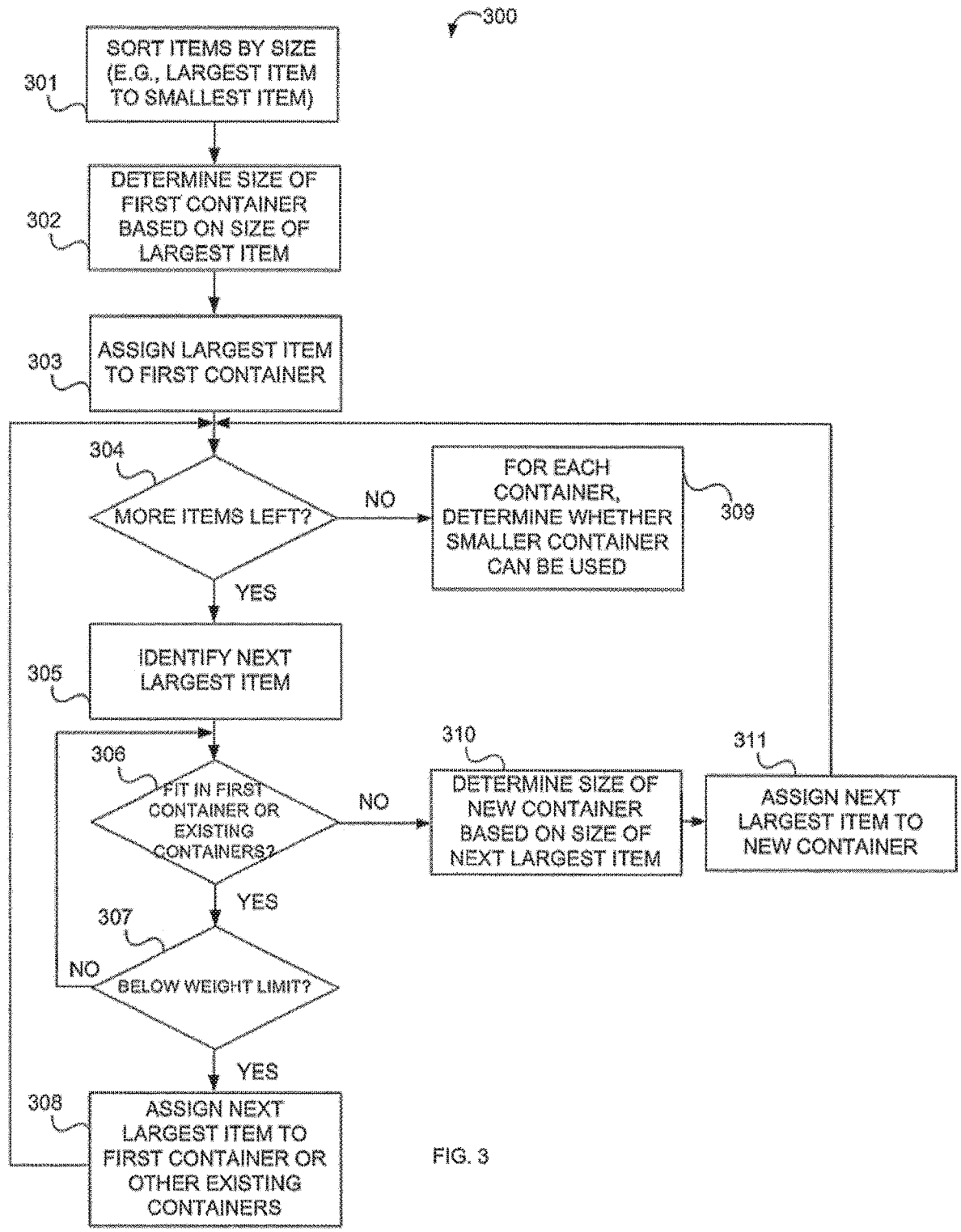
FIG. 3 illustrates a process for determining an optimal number and size of standardized containers, according to an aspect of the invention.

FIG. 3 illustrates a process 300 for determining an optimal number and size of standardized containers, according to an aspect of the invention.

Referring to FIG. 3, in an operation 301, process 300 may include sorting one or more items by size (e.g., from largest to smallest) based on the dimensional information (e.g., width, length, height, volume, shape, etc.) related to the one or more items.

In an operation 302, process 300 may include determining the size of a first standardized container based on the size of the largest item (determined based on the sorting). Once the size of the first standardized container has been determined, process 300 may include assigning the largest item to the first container in an operation 303.

In an operation 304, process 300 may determine whether there are more items left to be assigned to a standardized container. For example, if the order only included one item, process 300 may stop here and may proceed to an operation 309. On the other hand, if it is determined that there are more items in the order, process 300 may proceed to an operation 305.

In operation 305, process 300 may include identifying a second (or next) largest item that has been determined based on the sorting. In an operation 306, process 300 may determine whether the second largest item may be placed and/or fitted in the first standardized container. If the second largest item fits into the first standardized container, process 300 may proceed to an operation 307 in which process 300 may determine whether a weight limit related to the first container is violated if the second largest item is added to the container. If it is determined the weight limit is not violated (e.g., the sum of the weight of the first largest item and second largest item is below the weight limit), process 300 may proceed to an operation 308. In operation 308, process 300 may include assigning the second largest item to the first container.

If process 300 determines, in operation 306, that the second largest item does not fit into the first container, process 300 may include determining the size of a new (e.g., second) standardized container based on the size of the second largest item in an operation 310 and assigning the second largest item to the new standardized container in an operation 311.

Once the second largest item has been assigned a shipping container (e.g., first or second container), process 300 may return to operation 304. If process 300 determines that there are still more items left in the order in operation 304, process 300 may identify a third largest item in operation 305.

In operation 306, process 300 may determine whether the third largest item may be placed and/or fitted in any of the existing containers. For example, if the third largest item fits into the first container, it may be assigned to that container. If not, process 300 may check whether it may fit into the second container, if there is one. If it is determined that the third largest item does not fit into any of the existing containers, process 300 may assign the third largest item to a third standardized container in operation 311. In this manner, process 300 may iteratively identify a next largest item (in operation 305) and assign the item to a container (in operation 308 and 311) until all of the items have been assigned to a container.

In operation 309, process 300 may include determining an optimal size of standardized containers by re-evaluating the size of each of the standardized containers. For example, process 300 may determine whether the items assigned to each container may fit into a smaller container based on dimensional information related to the items and dimensional information related to the smaller container.

Figure 4:
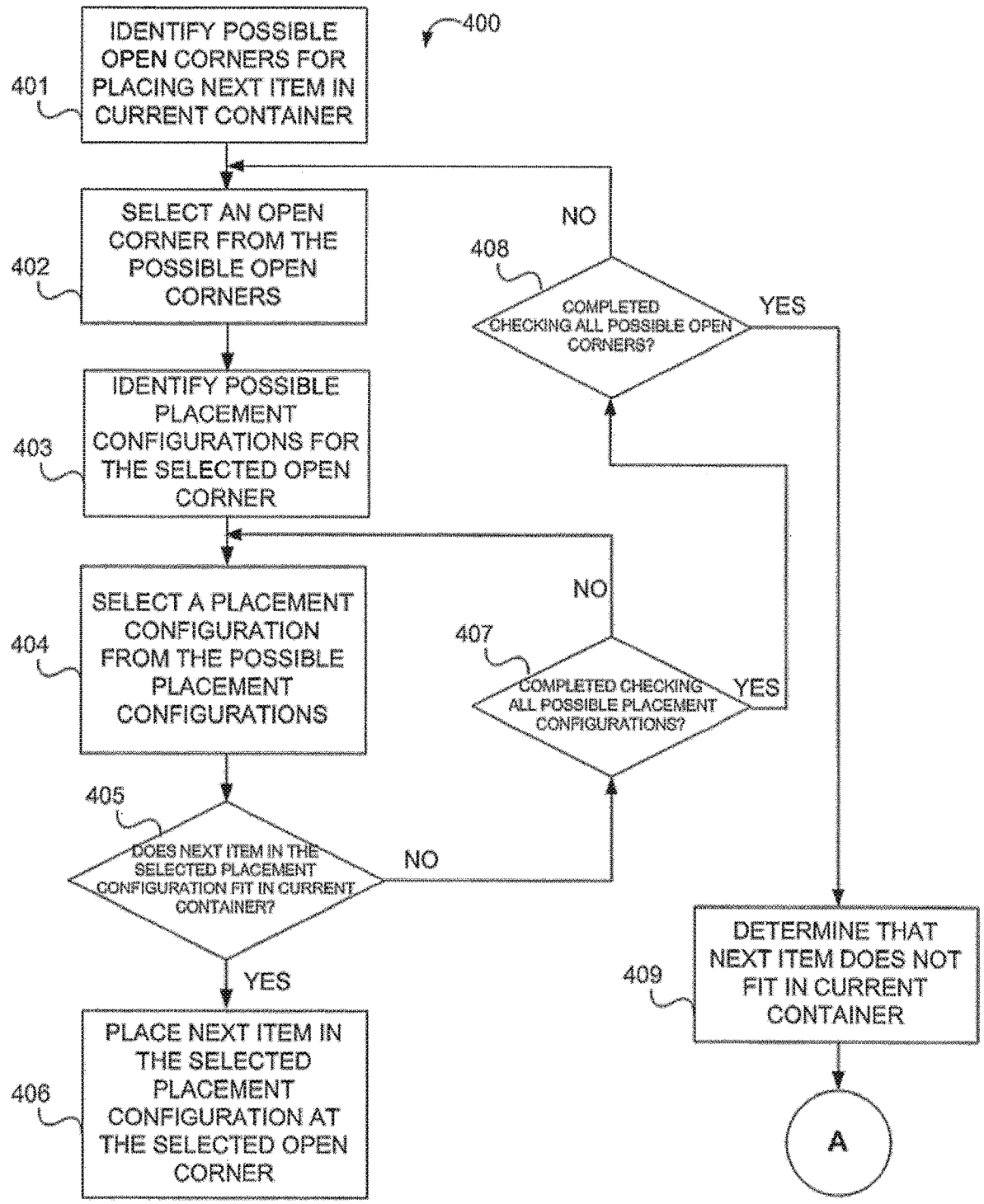
FIG. 4 illustrates a process for determining whether an item can fit in a container based on a cornering technique, according to an aspect of the invention.

FIG. 4 illustrates a process 400 for determining whether an item can fit in a container based on a cornering technique, according to an aspect of the invention.

Referring to FIG. 4, in an operation 401, process 400 may include identifying all possible open corners in which an item (e.g., next largest item) may be placed after a previous item gets placed in a particular corner (and/or before a first item gets placed in an empty container).

In an operation 402, process 400 may include selecting one of the identified possible open corners to place the next item. In operation 403, for the selected open corner, process 400 may identify all possible placement configurations of the item. The placement configuration of an item may be changed by changing a rotational orientation of the item.

In an operation 404, process 400 may include selecting one of the identified placement configurations. In operation 405, process 400 may include determining whether the item in the selected placement configuration fits in the container using the selected corner. For example, if the item in the selected placement configuration does not fit in the container using the selected corner (e.g., dimensions of the item in the particular placement configuration is larger than a dimensional space that is available around the selected corner), that particular placement configuration may not be the right choice and may be excluded from the possible choices.

On the other hand, if it is determined that the item in the selected placement configuration does fit in the container using the selected corner, process 400 may proceed to an operation 406. In operation 406, process 400 may include placing the item in that selected placement configuration at the selected open corner.

In an operation 407, process 400 may include determining whether process 400 has completed checking all of the possible placement configurations identified in operation 403 to see if any of them allowed a proper placement of the item in the selected corner. If it hasn't completed checking all of the possible placement configurations, process 300 may return to operation 404.

If it is determined that none of the possible placement configurations (identified in operation 403) allows a proper placement of the item in the selected corner, process 400 may proceed to operation 408 to determine whether process 400 has completed checking all of the possible open corners identified in operation 401 to see if any of them allowed the item to be placed in and/or assigned to the container. If it hasn't completed checking all of the possible open corners, process 400 may return to operation 402 to try a different open corner and check whether any of the possible placement configurations of the item allows the item to be properly placed in that corner. Process 400 may continue until an open corner with a placement configuration in which the item may be properly placed can be identified.

If none of the identified possible open corners (or different placement configurations for each corner) allows the item to be properly placed in the given container, process 400 may determine and/or conclude that the item does not fit in the given container in an operation 409.

Figure 5:
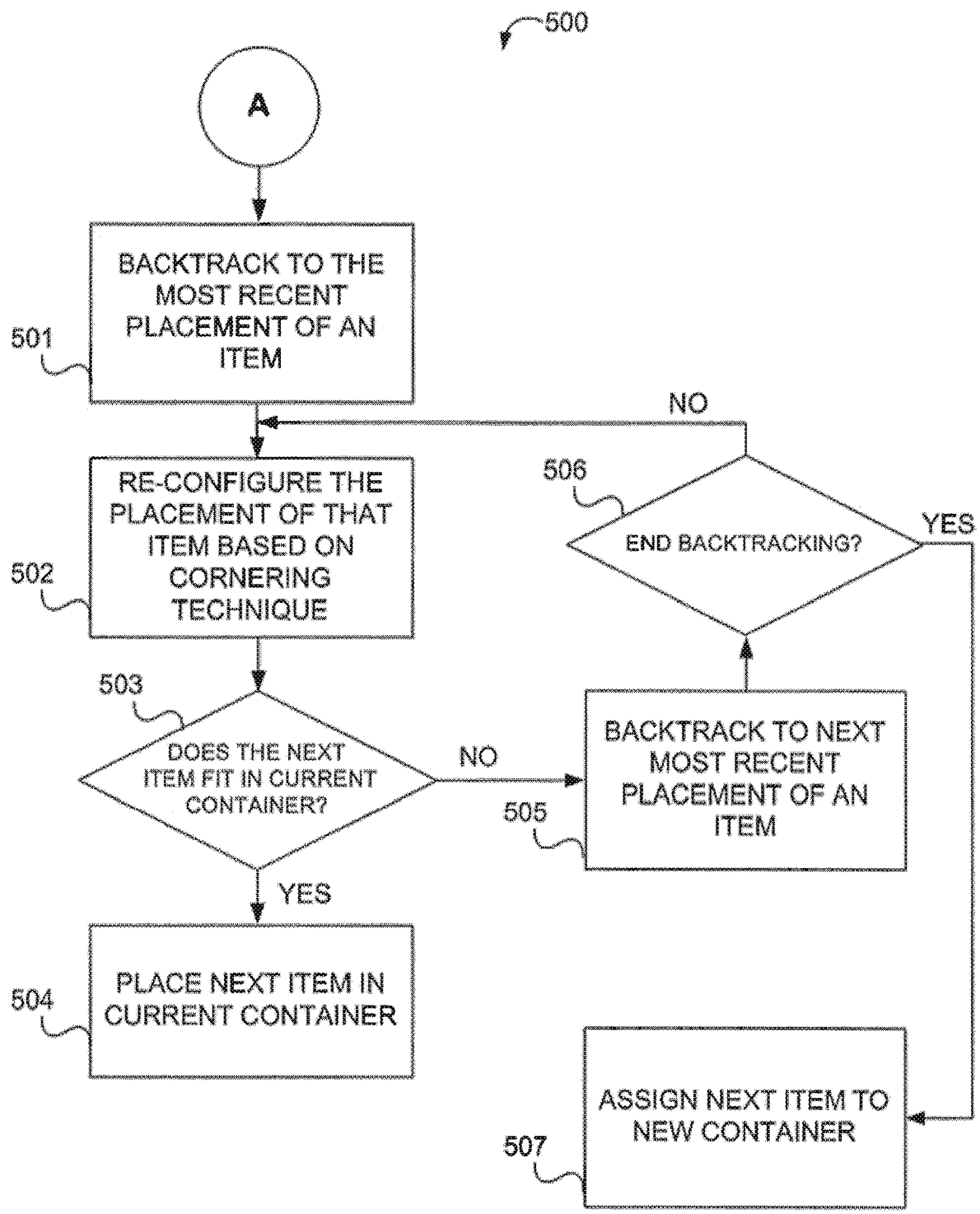
FIG. 5 illustrates a process for performing a backtracking operation, according to an aspect of the invention.

After determining that the item does not fit in the given container in operation 409, process 400 may proceed to a step of performing a backtracking operation as discussed herein with respect to FIG. 5.

FIG. 5 illustrates a process 500 for performing a backtracking operation, according to an aspect of the invention. The backtracking operation may be performed by re-arranging the existing items in the container using different combinations of open corners and/or placement configurations.

Referring to FIG. 5, in an operation 501, process 500 may include backtracking to the most recent placement of an item in the container. Process 500 may then re-configure the placement of that item based on the cornering technique 502 (as discussed herein with respect to FIG. 4). For example, if there had been 3 items in a given container and a fourth item failed to fit in the container using the current configuration of how the 3 items are placed in the container, process 500 may backtrack to a point at which the third item was getting placed in the container. For example, instead of the placement configuration that was previously selected for the placement of the third item, a different placement configuration may be selected. In another example, instead of the open corner that was previously selected for the third item, a different open corner may be selected. Once the third item is placed in a different open corner and/or a different placement configuration, process 500 may determine whether the fourth item can now fit in the given container in an operation 503. The determination of whether the fourth item can fit in the given container may be based on the cornering technique as discussed herein with respect to FIG. 4. If it is determined that the fourth item still does not fit in the container, process 500 may backtrack to a point at which the second item was getting placed in the container in an operation 505.

On the other hand, if it is determined that the fourth item fits in the container after re-configuring the placement of the existing items in the container, process 500 may include placing the item in the container based on a particular open corner and/or placement configuration determined in operation 503.

In an operation 506, process 500 may include determining whether the backtracking operation should end. The backtracking operation may end when it has backtracked all the way to a point at which the first item was getting placed in the container and/or after a predefined number of iterations of backtracking. Process 500 may cease the backtracking operation at that point and/or place the fourth item in a new container in an operation 507.

FIG. 6 illustrates a visual representation 600 of how a cornering technique may be implemented, according to an aspect of the invention. The visual representation illustrated in FIG. 3 and other drawing figures are for illustrative purposes only. Various components may be added, deleted, moved, or otherwise changed so that the configuration, appearance, and/or content of the drawing figures may be different than as illustrated in the figures. Accordingly, the graphical objects as illustrated (and described in greater detail below) are exemplary by nature and, as such, should not be viewed as limiting.

Referring to FIG. 6, visual representation 600 may include a standardized container 601 and a first item 605 that may be placed in container 601. To determine whether first item 605 fits in container 601, a cornering technique may be used. Since container 601 was initially an empty container, there are a total of 8 possible open corners in which first item 605 may be placed. Once first item 605 is placed in one corner (illustrated as an "occupied" corner 610 shown in solid line) among the 8 possible open corners, only 3 bottom corners including open corners 620, 630, and 640 (shown in dotted line) may remain as possible open corners for a next item. By the placement of first item 605 in corner 610, a maximum of 3 new open corners may be created. As illustrated, interface 600 may include 3 new open corners including open corners 611, 612, and 613 (shown in dotted line). Therefore, the total number after the placement of first item 605 in container 601 may equal to 6 open corners (e.g., open corners 611, 612, 613, 620, 630, and 640 shown in dotted line).

FIG. 7 illustrates a visual representation 700 of how a cornering technique may be implemented, according to an aspect of the invention.

Referring to FIG. 7, visual representation 700 may include a standardized container 701 and a first item 705 that has been placed in corner 710 (e.g., an "occupied" corner shown in dotted line). Interface 700 may also include a second item 706 that may be placed in container 701. There are 6 possible open corners in which second item 706 may be placed. The 6 possible open corners may be illustrated as open corners 711, 712, 713, 720, 730, and 740. Out of the 6 possible open corners, corner 712 may be selected and occupied by second item 706. Occupied corner 712 may be shown in solid line.

By the placement of second item 706 in corner 712, a maximum of 3 new open corners may be created. As illustrated, interface 700 may include 3 new open corners including open corners 721, 722, and 723 (shown in dotted line). Therefore, the total number of possible open corners may be updated to 8 open corners (e.g., open corners 711, 713, 720, 721, 722, 723, 730, and 740 shown in dotted line).

FIG. 8 illustrates a visual representation 800 of how a cornering technique may be implemented, according to an aspect of the invention.

Referring to FIG. 8, visual representation 800 may include a standardized container 801 and a first item 805 that has been placed in corner 810 (e.g., an "occupied" corner shown in dotted line). Interface 800 may also include a second item 806 that may be placed in container 501. There are 6 possible open corners in which second item 806 may be placed. The 6 possible open corners may be illustrated as open corners 811, 812, 813, 820, 830, and 840. Out of the 6 possible open corners, corner 813 may be selected and occupied by second item 806. Occupied corner 813 may be shown in solid line.

By the placement of second item 806 in corner 813, a maximum of 3 new open corners may be created. As illustrated, interface 800 may include 2 new open corners including open corners 821 and 822 (shown in dotted line). There are only 2 new open corners in this example because the height of second item 806 is the same as the height of first item 805. Therefore, the total number of possible open corners may be updated to 7 open corners (e.g., open corners 811, 812, 820, 821, 822, 830, and 840 shown in dotted line).

Figure 9:
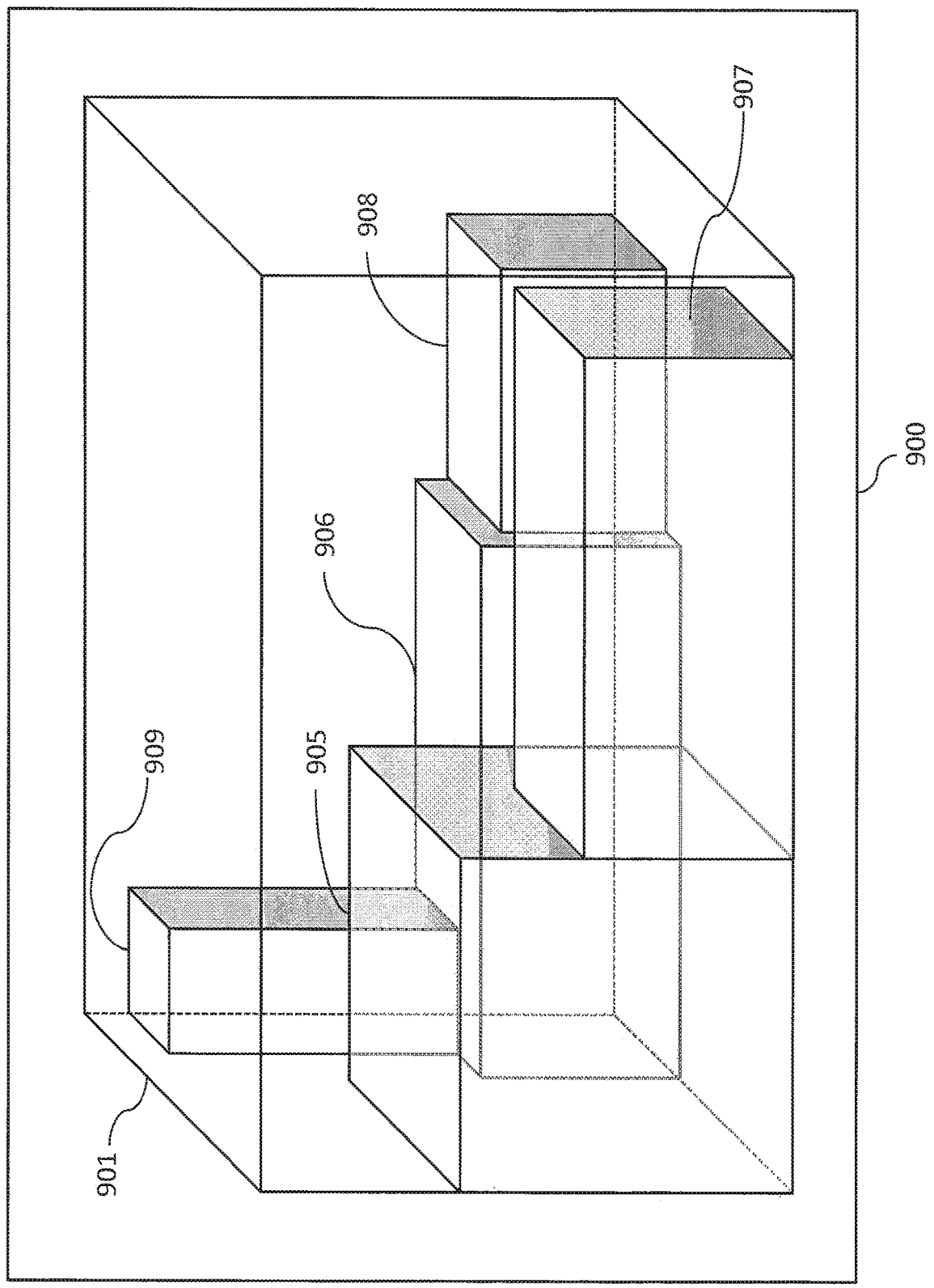
FIG. 9 illustrates a screenshot of an interface for generating a visual representation of how one or more items are arranged and/or positioned in a standardized container, according to an aspect of the invention.

FIG. 9 illustrates a screenshot of an interface 900 for generating a visual representation of how one or more items are arranged and/or positioned in a standardized container, according to an aspect of the invention.

Referring to FIG. 9, interface 900 and other interfaces described herein may be implemented as a web page communicated from computer 110 to a client, an application such as a mobile application executing on the client that receives generates the interface based on information communicated from computer 110, and/or other interface. Whichever type of interface is used, computer 110 may communicate the data and/or formatting instructions related to the interface to the client, causing the client to generate the various interfaces of FIG. 9 and other drawing figures. Furthermore, computer 110 may receive data from the client via the various interfaces, as would be appreciated.

Referring to FIG. 9, interface 900 may include a standardized container 901 and a visual representation of how items 905-909 are being positioned and/or placed in container 901. A user may change the positions and/or locations of items 905-909 by selecting a different corner to place an item via interface 900. Items 905-909 may be moved and/or dragged via interface 900 to change the positions and/or locations associated with items 905-909. The user may rotate items 905-909 to change a placement configuration related to items 905-909.

Figure 10:
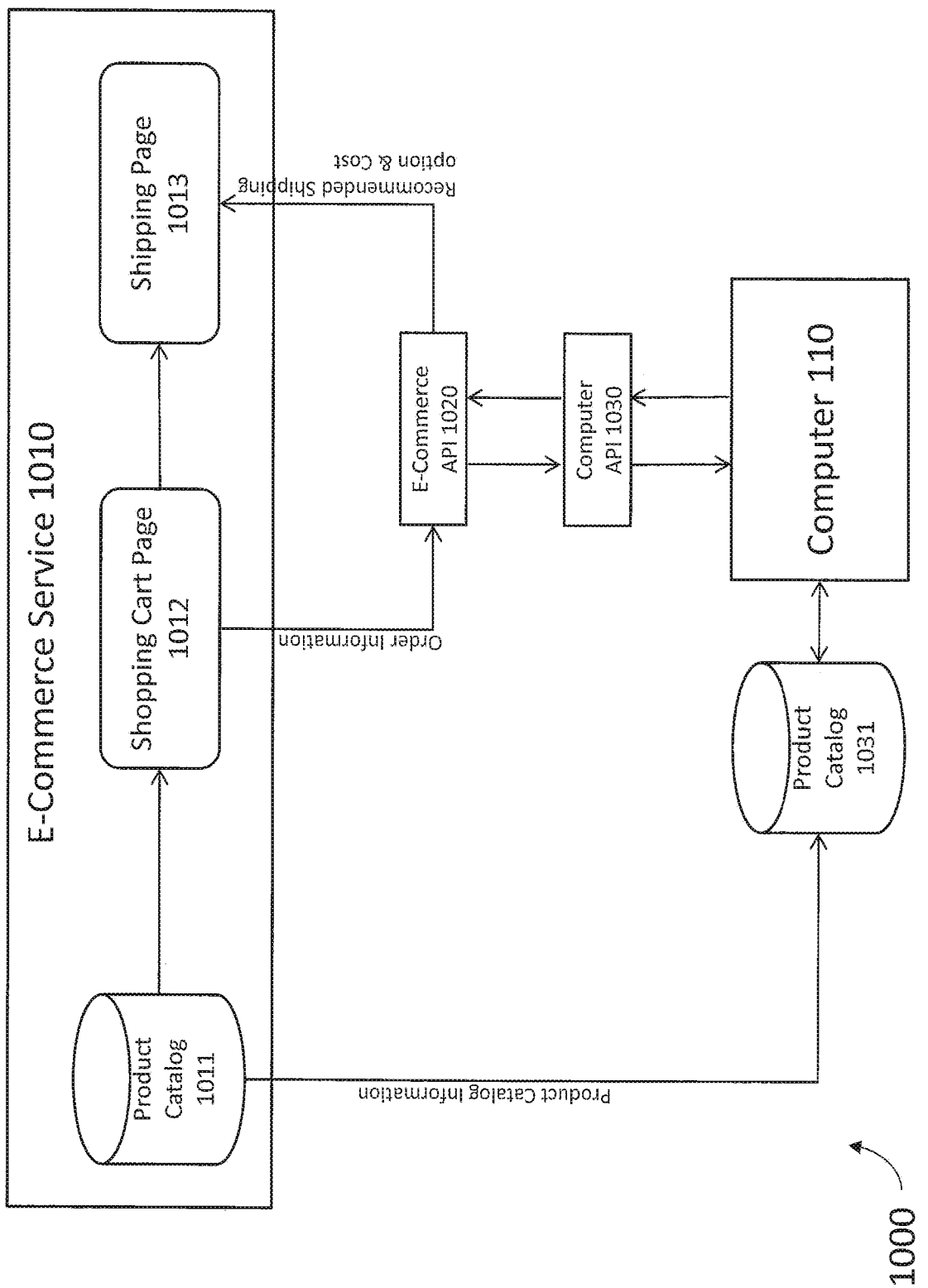
FIG. 10 illustrates a data flow diagram for a system for optimizing use of standardized containers, according to an aspect of the invention.

FIG. 10 illustrates a data flow diagram 1000 for a system for optimizing use of standardized containers, according to an aspect of the invention.

Referring to FIG. 10, computer 110 may interact with an e-commerce service 710. E-commerce service 1010 may be operated, maintained, and/or managed by a third-party partner vendor. For example, a customer may select one or more product items and save the items in a shopping cart via a shopping cart page 1012. Once the customer is ready to check out the items, e-commerce service 1010 may direct the customer to a shipping page 1013 to determine the cost for shipping the items in the shopping cart. Computer 110 may receive the order information (e.g., SKU information, order quantities) for each product item in the shopping cart.

In some embodiments, e-commerce service 710 may maintain a product catalog database 1011 that may store information related to the product items being sold by the vendor related to e-commerce service 1010. In some embodiments, e-commerce service 1010 may periodically transmit product catalog information stored in product catalog database 1011 to product catalog database 1031 that is linked to computer 110. In this way, product catalog database 1031 may be updated with up-to-date product catalog information.

Computer 110 may calculate a shipping cost for shipping the items using standardized containers based on the order information from shopping cart page 1012 and/or product catalog information from product catalog 1031. Computer 110 may also communicate the shipping cost calculated based standardized containers and/or shipping costs calculated for different shipping options (e.g., different shipping methods, carriers, etc.) provided by e-commerce service 1010. Computer 110 may compare the shipping cost calculated based on standardized containers with the shipping costs calculated for different shipping options. In some embodiments, computer 110 may select a shipping option that has the lowest shipping cost and communicate the recommendation to shipping page 1013. Via shipping page 1013, the customer may then accept the recommended shipping option and cost or select a different shipping option than the one recommended.

In some embodiments, when communicating and/or transmitting data (e.g., order information, shipping options and/or costs, etc.) between e-commerce service 1010 and computer 110, the data may be formatted to be compatible with one another. For example, when e-commerce 1010 sends the order information to computer 110, the order information may be formatted to be compatible with a computer API 1030. Similarly, when computer 110 communicates available shipping options and/or costs to e-commerce service 1010, the communicated information may be formatted to be compatible with an e-commerce API 1020. For example, when the customer moves from shopping cart page 1012 to shipping page 1013 by clicking "Next" button or some similar button (not illustrated), e-commerce service 1010 may make an API call (e.g., SOAP/XML) into computer 110 to communicate and/or transmit the order information (e.g., SKU information, order quantities, dimensions, quantities, etc.) based on computer API 1030. In response, computer 110 may communicate and/or transmit available shipping options and/or costs by making an API call into e-commerce service 1010 based on e-commerce API 1020.

Figure 11:
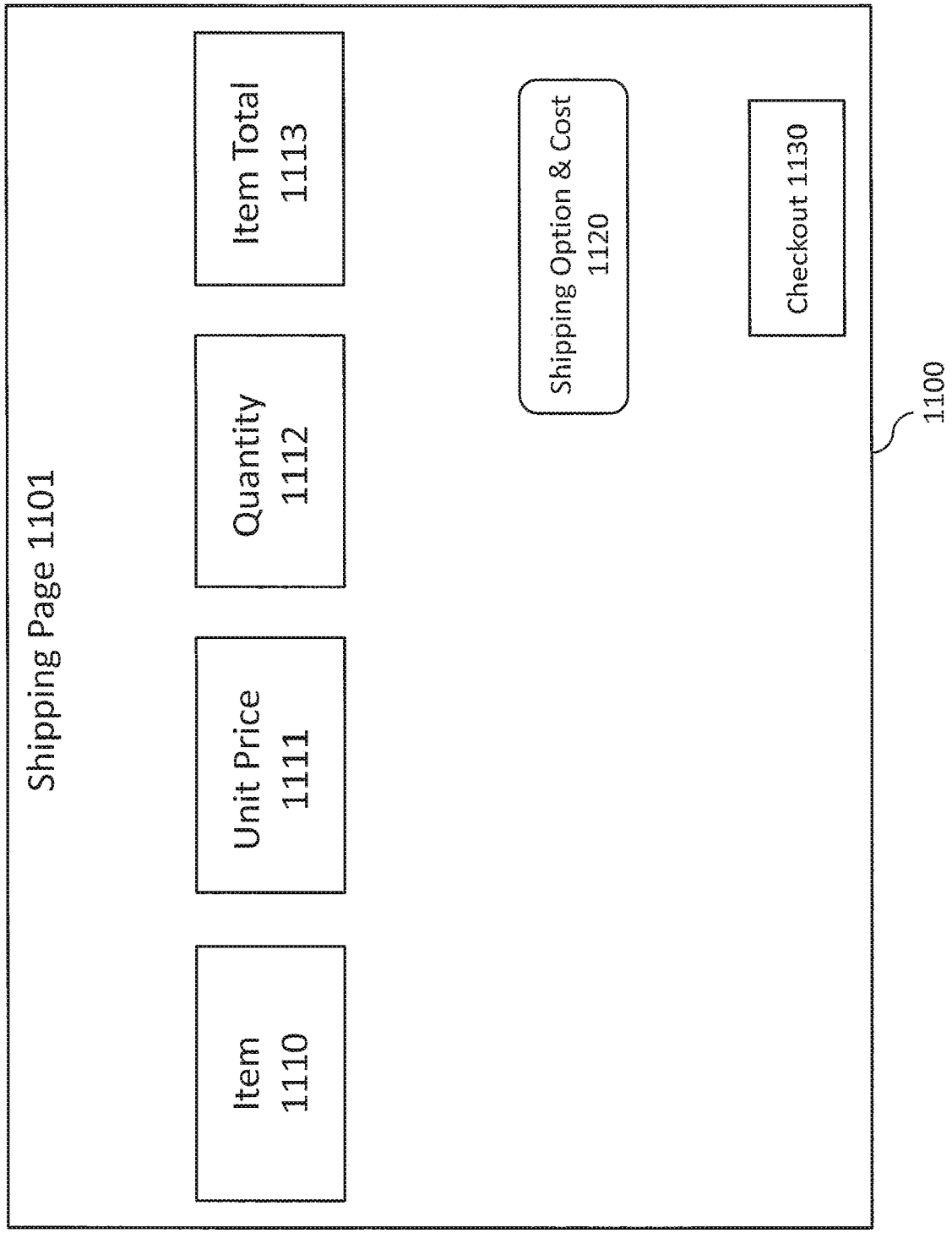
FIG. 11 illustrates a screenshot of an interface for displaying a recommended shipping option and shipping cost on a shipping page, according to an aspect of the invention.

FIG. 11 illustrates a screenshot of an interface 1100 for displaying a recommended shipping option and shipping cost on a shipping page, according to an aspect of the invention.

Referring to FIG. 11, interface 1100 may include a shipping page 1101. Via shipping page 1101, an item element 1110 may display one or more items in a shopping cart, the description and/or images of the items, and/or other information related to the items. A unit price element 1111 may include a unit price for individual items. Interface 1100 may include a quantity element 1112 that may display a quantity for each item. In some embodiments, a customer (and/or a user) may change, modify, and/or update the quantity for an item using the quantity element 1112. An Item total 1113 may display the total cost for each item, which may be calculated by multiplying a unit price and quantity for each item.

Interface 1100 may include a shipping option & cost element 1120. When computer 110 communicates a shipping option and cost recommended for shipping the items displayed by item element 1110, the recommended shipping option and cost may be displayed via shipping option & cost element 1120. The customer may accept the recommended shipping option and cost or may select a different shipping option via shipping option & cost element 1120. In some embodiments, shipping option & cost element 1120 may include a dropdown list of different shipping options available for the customer. Interface 1100 may include a checkout button 1130 which may be used to check-out (and/or purchase) the items in the shopping cart and accept the shipping option that is displayed by shipping option & cost element 1120.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system comprising:
a computer system comprising one or more processors programmed with computer instructions that, when executed by the one or more processors, cause the one or more processors to perform operations, the operations comprising:
receiving from an e-commerce service, via a user interface, a user selection to purchase a plurality of items;
determining a placement of the items based on a threshold such that one or more items of the items are rearranged in a standardized container having a plurality of open corners to attempt to create an available region within one of the plurality of open corners within which a given next item fits in the standardized container without exceeding the threshold;
moving item representations of the items to regions of a visual representation of the standardized container on the user interface based on the determined placement of the items and a backtracking operation performed by re-arranging item representations of the one or more items in the standardized container using different combinations of open corners and placement configurations;
obtaining a shipping cost for the standardized container for shipping via obtaining size information of the items from an item catalog database and size and cost information of different standardized containers from a container specification database;
determining a number and size of the standardized container based on the determined placement of the items; and
calculating a total shipping cost based on the determined number and size of the standardized container and the obtained shipping cost.

2. The system of claim 1, wherein the determining the placement of the items comprises performing one or more iterations of the following:
identifying a next item of the items as an item to be potentially assigned to a region in the standardized container;
determining whether the next item fits within an available region in the standardized container, the available region being a region not currently assigned an item;
responsive to a determination that a given region is the available region and the next item fits within the given region, assigning the next item to the given region in the standardized container;
responsive to a determination that there is no available region within which the next item fits, performing, based on the threshold, a rearrangement of the one or more items in the standardized container with respect to their assigned regions to attempt to create an available region within which the next item fits such that the rearrangement of the one or more items does not exceed the threshold; and
responsive to the rearrangement of the one or more items creating the available region within which the next item fits, assigning the next item to the available region that is created.

3. The system of claim 1, the operations further comprising:
subsequent to moving the item representations of the items, enabling a user-initiated movement of a first item representation of the item representations; and
responsive to receiving a user input to move the first item representation, rearranging the first item representation on the user interface based on the user input.

4. The system of claim 3, the operations further comprising:
responsive to receiving the user input to move the first item representation, rearranging a second item representation on the user interface based on the user input without receiving a second user input specifying movement of the second item representation, the second item representation corresponding to a second item different from a first item to which the first item representation corresponds.

5. The system of claim 3, wherein the rearrangement of the first item representation comprises moving the first item representation to a different position on the user interface based on the user input.

6. The system of claim 3, wherein the rearrangement of the first item representation comprises rotating the first item representation on the user interface based on the user input.

7. A method comprising:
receiving from an e-commerce service, by one or more processors, via a user interface, a selection to purchase a plurality of items;
determining, by the one or more processors, a placement of the items based on a threshold such that one or more items of the items are rearranged in a standardized container having a plurality of open corners to attempt to create an available region within one of the plurality of open corners within which a given next item fits in the standardized container without exceeding the threshold; and
moving, by the one or more processors, item representations of the items to regions of a visual representation of the standardized container on the user interface based on the determined placement of the items and a backtracking operation performed by re-arranging item representations of the one or more items in the standardized container using different combinations of open corners and placement configurations;
obtaining, by the one or more processors, a shipping cost for the standardized container for shipping via obtaining size information of the items from an item catalog database and size and cost information of different standardized containers from a container specification database;
determining, by the one or more processors, a number and size of the standardized container based on the determined placement of the items; and
calculating, by the one or more processors, a total shipping cost based on the determined number and size of the standardized container and the obtained shipping cost.

8. The method of claim 7, wherein the determining the placement of the items comprises performing one or more iterations of the following:
identifying a next item of the items as an item to be potentially assigned to a region in the standardized container;
determining whether the next item fits within an available region in the standardized container, the available region being a region not currently assigned an item;
responsive to a determination that a given region is the available region and the next item fits within the given region, assigning the next item to the given region in the standardized container;
responsive to a determination that there is no available region within which the next item fits, performing, based on the threshold, a rearrangement of the one or more items in the standardized container with respect to their assigned regions to attempt to create the available region within which the next item fits such that the rearrangement of the one or more items does not exceed the threshold; and
responsive to the rearrangement of the one or more items creating the available region within which the next item fits, assigning the next item to the available region that is created.

9. The method of claim 7, wherein the determining the placement of the items comprises determining the placement of the items based on the threshold such that the one or more items are rearranged with respect to the standardized container to attempt to create an available region within which a given next item fits in the standardized container without exceeding the threshold.

10. The method of claim 7, further comprising:
subsequent to moving the item representations of the items, enabling, by the one or more processors, a user-initiated movement of a first item representation of the item representations; and
responsive to receiving a user input to move the first item representation, rearranging, by the one or more processors, the first item representation on the user interface based on the user input.

11. The method of claim 10, further comprising:
responsive to receiving the user input to move the first item representation, rearranging, by the one or more processors, a second item representation on the user interface based on the user input without receiving a second user input specifying movement of the second item representation, the second item representation corresponding to a second item different from a first item to which the first item representation corresponds.

12. The method of claim 10, wherein the rearrangement of the first item representation comprises moving the first item representation to a different position on the user interface based on the user input.

13. The method of claim 10, wherein the rearrangement of the first item representation comprises rotating the first item representation on the user interface based on the user input.

* * * * *